United States Patent
Suzuki et al.

(10) Patent No.: US 9,546,877 B2
(45) Date of Patent: Jan. 17, 2017

(54) NAVIGATION SYSTEM

(71) Applicants: TOYOTA JIDOSHA KABUSHIKI KAISHA, Toyota-shi, Aichi (JP); FUJITSU TEN LIMITED, Kobe-shi, Hyogo (JP)

(72) Inventors: Shinichi Suzuki, Okazaki (JP); Atsushi Nishida, Aichi-gun (JP); Isao Ishibashi, Toyota (JP); Masahisa Ishibashi, Nisshin (JP); Yasutaka Yoshimura, Miyoshi (JP); Kenichi Murata, Tokyo (JP)

(73) Assignees: TOYOTA JIDOSHA KABUSHIKI KAISHA, Toyota (JP); FUJITSU TEN LIMITED, Kobe (JP)

( * ) Notice: Subject to any disclaimer, the term of this patent is extended or adjusted under 35 U.S.C. 154(b) by 0 days.

(21) Appl. No.: 14/408,783

(22) PCT Filed: Sep. 24, 2013

(86) PCT No.: PCT/JP2013/005643
§ 371 (c)(1),
(2) Date: Dec. 17, 2014

(87) PCT Pub. No.: WO2014/073141
PCT Pub. Date: May 15, 2014

(65) Prior Publication Data
US 2015/0168165 A1    Jun. 18, 2015

(30) Foreign Application Priority Data

Nov. 6, 2012  (JP) .................................. 2012-244154

(51) Int. Cl.
G01C 21/34    (2006.01)
G01C 21/36    (2006.01)

(52) U.S. Cl.
CPC .......... *G01C 21/34* (2013.01); *G01C 21/3415* (2013.01); *G01C 21/3476* (2013.01); *G01C 21/3682* (2013.01)

(58) Field of Classification Search
CPC .. G01C 21/34; G01C 21/3415; G01C 21/3476
See application file for complete search history.

(56) References Cited

U.S. PATENT DOCUMENTS

| 5,906,654 A | 5/1999 | Sato |
| 2003/0158658 A1 | 8/2003 | Hoever et al. |

(Continued)

FOREIGN PATENT DOCUMENTS

| EP | 1 669 719 A1 | 6/2006 |
| JP | 2005-234877 A | 9/2005 |

(Continued)

*Primary Examiner* — Basil T. Jos
(74) *Attorney, Agent, or Firm* — Oliff PLC

(57) ABSTRACT

A navigation system is provided which dynamically changes a destination so as to meet a user's objective, based on various changes in situation which occur during traveling, and indicates a changed destination to the user. An objective representing an action of a user is recognized based on information inputted by the user (S201). A place at which the recognized objective can be achieved is set as a destination (S203). Guidance is performed so as to reach the destination having been set (S204). When it is determined, during traveling based on the guidance, that the objective is difficult to achieve, a substitute place at which the objective can be achieved is set as a destination (S206 to S209).

6 Claims, 4 Drawing Sheets

(56) References Cited

U.S. PATENT DOCUMENTS

| | | | |
|---|---|---|---|
| 2005/0021227 A1* | 1/2005 | Matsumoto et al. | ......... 701/207 |
| 2008/0177462 A1 | 7/2008 | Yoshioka et al. | |
| 2010/0027527 A1 | 2/2010 | Higgins et al. | |
| 2013/0268187 A1* | 10/2013 | Scofield | ............. G01C 21/3685 |
| | | | 701/400 |

FOREIGN PATENT DOCUMENTS

| JP | A-2009-014536 | 1/2009 |
|---|---|---|
| JP | 2010-169418 A | 8/2010 |
| JP | A-2010-185698 | 8/2010 |
| JP | 2011-185666 A | 9/2011 |

* cited by examiner

NAVIGATION SYSTEM

TECHNICAL FIELD

The present invention relates to navigation systems, mounted as hardware or software to in-vehicle devices or portable mobile devices, for performing guidance on a route from a present position to a destination.

BACKGROUND ART

Various types of so-called navigation systems that perform guidance on a route from a present position to a destination designated by a user (particularly referred to as a driver in the description for in-vehicle navigation systems), have been developed and put into practical use. For example, standard in-vehicle navigation systems and the like determine momentarily changing road situations such as traffic jam or construction, dynamically change a route to an optimal route to the destination, and indicate the route.

Further, in Patent Literature 1, a navigation apparatus that retrieves and indicates, according to a destination inputted by a driver, a parking area near the destination, is disclosed. According to Patent Literature 1, a degree of congestion of a parking area (for example, closest to the destination) that has been firstly indicated is continuously checked, and, in a case where it is determined, while the vehicle is travelling, that a probability that this parking area is available is low, another parking area (for example, second-closest to the destination) is indicated.

CITATION LIST

Patent Literature

PTL 1: Japanese Laid-Open Patent Publication No. 2009-014536
PTL 2: Japanese Laid-Open Patent Publication No. 2010-185698

SUMMARY OF INVENTION

Technical Problem

In the conventional technique disclosed in Patent Literature 1, substitute parking areas near the destination are indicated one after another, and a parking area can be changed. However, in the conventional technique, a destination to which a driver is going to reach remains unchanged unless the driver intentionally resets a destination. Therefore, as the number of times the substitute parking area is indicated is increased, the indicated parking area becomes farther from the destination, which may be unsatisfactory to the driver.

As a technique for changing a destination to which a driver is going to reach, an in-vehicle electronic device disclosed in Patent Literature 2 has been suggested. However, in the technique disclosed in Patent Literature 2, in a case where a destination inputted by a driver coincides with a destination, as is previously stored in a database, at which an accident may occur with a high frequency, a substitute destination is indicated. Therefore, a destination is set to a substitute place in which an accident is less likely to occur, at an initial stage in which guidance by the in-vehicle electronic device is started, and, while the vehicle is travelling toward the destination having been firstly set, the destination is not dynamically changed by a situation being continuously determined.

Therefore, the present invention is to make available a navigation system capable of dynamically changing a destination so as to meet a user's objective or another similar objective, based on various changes in situation which occur during travelling, and indicating a changed destination to the user.

Solution to Problem

The present invention is directed to a navigation system that preforms route guidance according to input information. In order to attain the aforementioned object, the navigation system of the present invention includes: an input section to which information including an objective is inputted by a user; an objective recognition section configured to recognize the objective representing an action of the user, based on the information inputted to the input section; a destination setting section configured to set, as a destination, a place at which the objective recognized by the objective recognition section can be achieved; and a guidance processing section configured to perform guidance so as to reach the destination having been set by the destination setting section. When it is determined, during traveling based on the guidance, that the objective is difficult to achieve within a predetermined time, the destination setting section indicates a substitute destination at which the objective can be achieved.

According to the features described above, the information inputted by a user is analyzed, and an objective is recognized, and a destination can be dynamically changed to a destination at which a user's objective can be achieved within a predetermined time, based on various changes in situation which occur during traveling, and a changed destination can be indicated.

According to the present invention, the objective inputted to the input section may be an action of a user which does not involve a destination toward which a vehicle travels.

Thus, the present invention can be applied to not only in-vehicle devices such as car navigations, but also portable mobile devices such as smartphones.

Further, when there is not a substitute destination at which the objective can be achieved, the destination setting section may indicate a substitute destination at which another objective similar to the objective can be achieved.

According to the features described above, the information inputted by a user is analyzed, and the objective is recognized, and a destination can be dynamically changed, with a flexibility, to destinations at which a user's objective including another objective similar to the objective can be achieved within a predetermined time, based on various changes in situation which occur during traveling, and a changed destinations can be indicated.

Further, the destination setting section may monitor at least an estimated time required for traveling to the destination and an estimated time required for achieving the objective at the place, to determine whether the objective can be achieved or the objective is difficult to achieve.

According to the features described above, whether the objective can be achieved within a predetermined time or the objective is difficult to achieve within the predetermined time, can be accurately determined.

Moreover, the destination setting section may determine a place at which the objective can be achieved, according to a condition based on private information of a user. The condition based on the private information of the user may be associated with at least one of a taste of the user, a character of the user, and a constitution of the user.

According to the features described above, a more appropriate destination can be set for a user as a place at which the objective recognized by the objective recognition section can be achieved.

Further, the present invention is directed to a navigation method for performing route guidance according to input information. In order to attain the aforementioned object, the navigation method of the present invention includes: recognizing an objective representing an action of a user, based on the information that is inputted by the user and that includes the objective; setting, as a destination, a place at which the recognized objective can be achieved; performing guidance so as to reach the destination having been set; determining, during traveling based on the guidance, whether the objective can be achieved within a predetermined time, or the objective is difficult to achieve within the predetermined time; and indicating a substitute destination at which the objective can be achieved, when it is determined that the objective is difficult to achieve within the predetermined time.

According to the features described above, the information inputted by a user is analyzed, and an objective is recognized, and a destination can be dynamically changed to a destination at which a user's objective can be achieved within a predetermined time, based on various changes in situation which occur during traveling, and a changed destination can be indicated.

Advantageous Effects of Invention

According to the present invention, a destination can be dynamically changed so as to meet a user's objective or another similar objective, based on various changes in situation which occur during traveling, and a changed destination can be indicated to the user.

DESCRIPTION OF EMBODIMENTS

Hereinafter, an embodiment of the present invention will be described with reference to the drawings. In the present embodiment, an exemplary case where a navigation system is mounted to a vehicle will be described.

Figure 1:
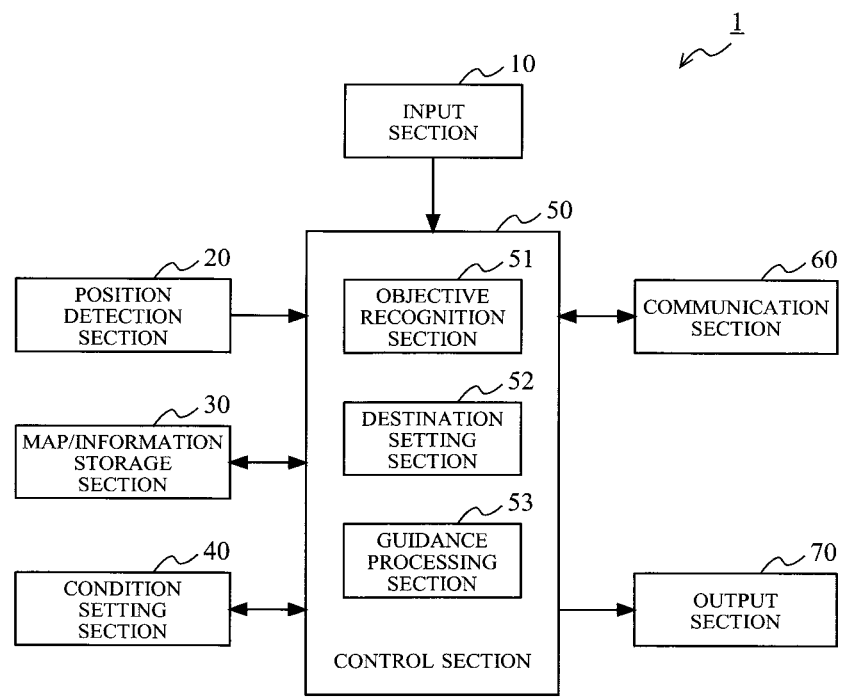
FIG. 1 illustrates an exemplary configuration of a navigation system 1 according to one embodiment of the present invention.

FIG. 1 illustrates an exemplary configuration of a navigation system 1 according to one embodiment of the present invention. In FIG. 1, the navigation system 1 according to the present embodiment includes an input section 10, a position detection section 20, a map/information storage section 30, a condition setting section 40, a control section 50, a communication section 60, and an output section 70.

Firstly, an outline of the components of the navigation system 1 will be described.

The input section 10 is an interface that receives an input of information from a driver on a navigation operation, and is implemented as a physical button such as a cross key or a numeric keypad, a touch panel, or a microphone for collecting sounds from a driver. The input section 10 transmits, to the control section 50, the information inputted by the driver.

The position detection section 20 includes a speed sensor, a gyro sensor, a GPS (Global Positioning System) receiver, and the like (not shown), and detects, for example, a present position of a vehicle. The speed sensor detects a speed at which a vehicle is travelling, and the gyro sensor detects a direction in which a vehicle is traveling. Further, the GPS receiver detects an absolute position of a vehicle on earth, based on information transmitted from an artificial satellite for the GPS. The position detection section 20 transmits, to the control section 50, results of the detections of the sensors and the receiver.

The map/information storage section 30 is structured by a storage medium such as a ROM (Read Only Memory) like a CD (Compact Disk) and a DVD (Digital Versatile Disk), and an HDD (hard disk drive). In the map/information storage section 30, map data (roads, topographical background, and the like) necessary for calculation of an optimal route, and information (National Route Nos., names of intersections, and the like) necessary for the guidance, are stored. Further, in the map/information storage section 30, various information (for example, famous places/specialties in tourist spots, menu/opening hours/non-opening days of restaurants, recognizability/popularity (ranking) of facilities, usage fees, and the like) associated with facilities and places represented by the map data, are stored. The information stored in the map/information storage section 30 is utilized as appropriate in processing executed by the control section 50. It is desirable that the information stored in the map/information storage section 30 is updated and increased as appropriate by communication with an external data center (not shown) through the communication section 60.

The condition setting section 40 has set therein, for example, not only conditions indispensable to navigation processing, such as a region (for example, within a 5 km radius or within 15 minutes' traveling) in which a surrounding area is explored, and a road (for example, excluding roads the width of which is less than or equal to 3 m) to be set as a route, but also various conditions based on information (private information) about a driver such as the day's schedule (for example, return home before 6 p.m.), his/her taste (for example, having a taste for ramen noodles), his/her character (for example, hot-tempered), or his/her constitution (allergy to wheat, or the like). These conditions are set by a driver through the input section 10, and are used in the processing executed by the control section 50.

The control section 50 is an electronic control unit (ECU) that is a central part of the navigation system 1, and includes a central processing unit (CPU), a memory, an input/output interface, and the like. The control section 50 functions as an objective recognition section 51, a destination setting section 52, and a guidance processing section 53 by the CPU reading, interpreting, and executing a program stored in the memory.

The objective recognition section 51 analyzes information (text) inputted by a driver through the input section 10, to recognize an "objective" contained in the information. The inputted information is data in a text format or a sound format, and a well-known analyzing manner can be used for analyzing the information. The "objective" defined in the present invention is interpreted more broadly than geographical destinations such as "facility (station, restaurant, department store)", "place (park, sea)", and the like as are handled in general route guidance processing, and the "objective" includes an action, such as "would like to eat specialty food" or "would like to buy souvenirs", which is desired by a driver and which does not involve a destination toward which a vehicle is to travel.

The destination setting section 52 extracts one or a plurality of places that meet the objective recognized by the objective recognition section 51 and that satisfy the conditions set in the condition setting section 40, based on the data stored in the map/information storage section 30 and/or data obtained from the data center (not shown) through the communication section 60. The "place" defined in the present invention represents a place in which a driver can achieve his/her objective. Therefore, when, for example, the driver's objective is to "desire to go to eat in Restaurant XX", the objective (destination)="Restaurant XX" is satisfied, and the objective directly represents the place. On the other hand, when the driver's objective is to "desire to go to eat specialty food", the objective (destination)="specialty food" is satisfied, and the objective does not represent a place, and "Restaurant XX in which the objective can be achieved represents the place. The destination setting section 52 transmits, to the data center, a keyword associated with the objective, to obtain data, about stores and the like, associated with the objective. However, when the data stored in the map/information storage section 30 suffices, communication with the data center is unnecessary. One or a plurality of places having been extracted is indicated to the driver by display on a screen or sound output through the output section 70. The destination setting section 52 sets a place selected by the driver, as a destination for which the navigation is to be performed.

The guidance processing section 53 performs well-known processing such as retrieval of an optimal route, guidance, and map matching. Retrieval of an optimal route is a process of obtaining an optical route from a present position of the vehicle to the destination having been set by the destination setting section 52. As the guidance, guidance at an intersection or a road fork on the route is performed for a vehicle that travels along the obtained route. In the map matching, mapping of a present position detected by the position detection section 20 onto a road in the map is performed.

The communication section 60 is a communication interface for realizing interactive communication between the navigation system 1 and the not-illustrated data center.

The output section 70 is implemented as a display for indicating, as an image, guidance on an area near the optimal route from the present position of the vehicle to the destination, or implemented as a speaker for outputting the guidance as a sound, and the guidance includes map information, the present position, and guide information as is processed by the control section 50.

<Destination Setting Process>

Figure 2:
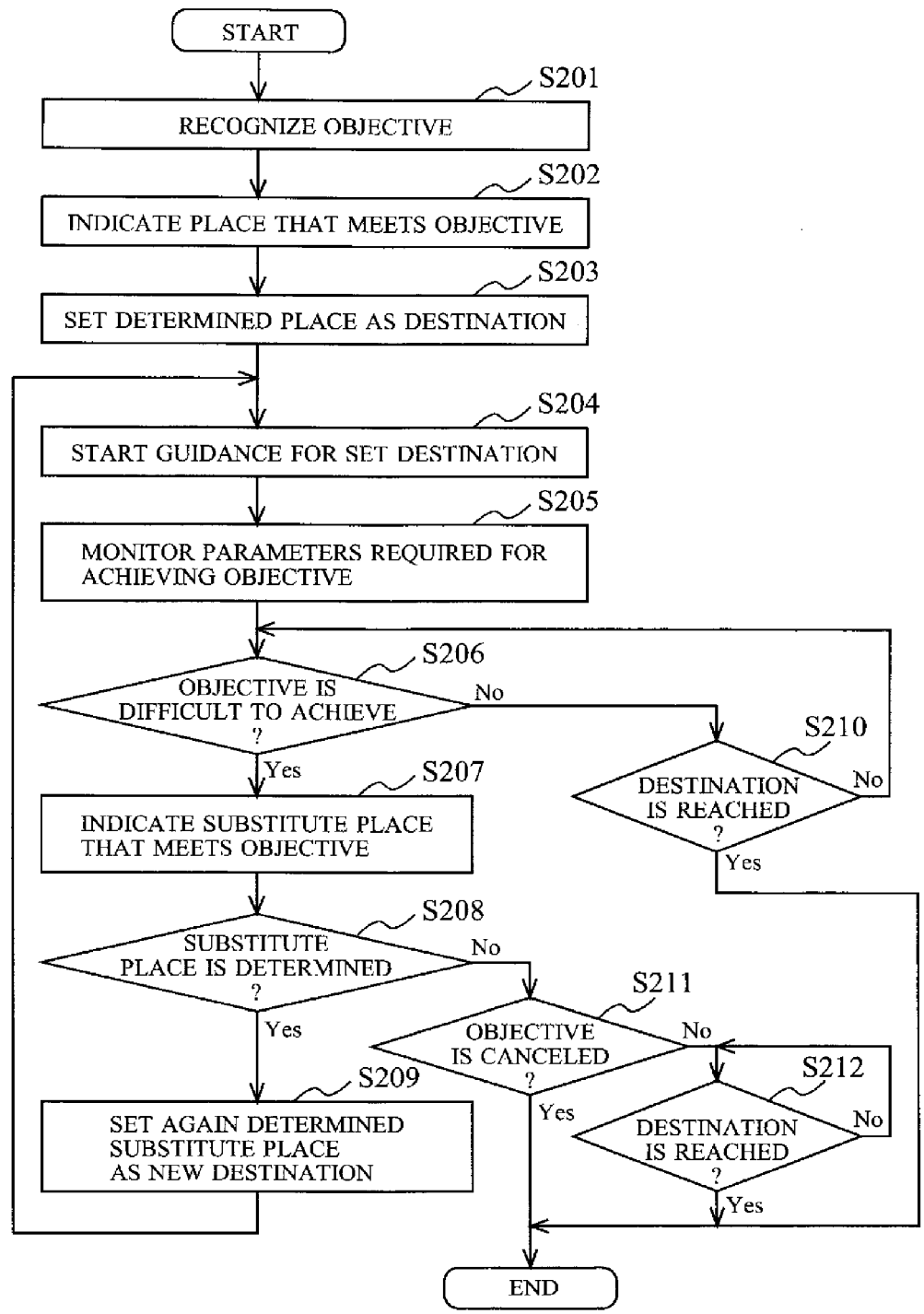
FIG. 2 is a flow chart showing process steps of a destination setting process executed by the navigation system 1 of the embodiment.

Next, a destination setting process executed by the navigation system 1 of the present embodiment having the configuration as described above, will be described in detail with reference to FIG. 2. FIG. 2 is a flow chart showing process steps of the destination setting process executed by the navigation system 1 of the present embodiment.

The destination setting process shown in FIG. 2 is started by a driver inputting, to the input section 10, information including an "objective". When the information including the objective is inputted, the objective recognition section 51 analyzes the information to recognize the objective (step S201).

For example, in a case where the information (text) inputted by the driver represents "would like to eat specialty food at lunch so as to be stuffed therewith", the objective recognition section 51 recognizes, as the objective, "specialty food" and "would like to eat" in the information.

The destination setting section 52 extracts one or a plurality of places that meet the objectives recognized by the objective recognition section 51 and that satisfy the conditions set in the condition setting section 40, based on the data stored in the map/information storage section 30 and/or data obtained from the data center through the communication section 60. The extracted place is indicated to the driver by display on the screen or sound output through the output section 70 (step S202).

For example, in a case where "specialty food" and "would like to eat" are recognized as the objective by the objective recognition section 51, the destination setting section 52 retrieves restaurants (places) in which the specialty food is served, in an area near the vehicle, by using the "specialty food" as a key, and the retrieval result is indicated to the driver, and the driver is prompted to select from the places. The number of the retrieval results to be indicated to the driver may be one or plural. Further, in a case where the number of the specialty foods is plural, the plurality of specialty foods may be indicated to the driver, or only specialty foods (or restaurants where the specialty foods are served) that meet the driver's taste having been set by the condition setting section 40 may be indicated to the driver.

When one of the places indicated by the output section 70 is determined by the driver, the destination setting section 52 sets the selected place as a destination for which the navigation is to be performed (step S203). The guidance processing section 53 generates an optimal route to the destination set by the destination setting section 52, and starts the guidance (step S204). The optimal route can be generated according to a well-known algorithm.

When the guidance for the destination according to the optimal route is started, the destination setting section 52 starts monitoring parameters that affect achievement of the objective recognized by the objective recognition section 51 (step S205). The parameters are preset according to the objectives, and are sequentially supplied to the destination setting section 52 through the communication section 60 from the data center and the like. For example, in a case where the destination is a restaurant, the destination setting section 52 monitors a traffic situation (for example, whether or not a traffic jam has occurred, or a degree of the traffic jam) in a route toward the restaurant, whether or not a parking area of the restaurant is available, whether or not the restaurant is full (waiting time), and the like.

The destination setting section 52 determines, as appropriate, whether or not the objective is difficult to achieve with the conditions set in the condition setting section 40 being satisfied, based on the monitored parameters (step S206). Achievement of the objective represents, for example, the following states. In a case where the objective is to consume food and drink, the objective is achieved when a meal is ended. In a case where the objective is to purchase goods, the objective is achieved when the goods are purchased. In a case where the objective is to watch a movie, the objective is achieved when screening of the movie is ended. Needless to say, in a case where a facility or a place is set as the objective, the objective is achieved when the facility or the place is reached. A case where an objective is difficult to achieve refers to a case where the achievement of the objective as described above cannot be performed within a predetermined time.

A specific example of determination as to whether or not an objective is difficult to achieve will be described.

For example, a case is assumed where, according to an objective representing "would like to eat YY ramen noodles before 1 p.m. at which I have an appointment with a friend in A city", Restaurant B where the YY ramen noodles are served is set as the destination, and the driver is driving. In this case, in a case where t1 represents an estimated time necessary for traveling from the present position to Restaurant B, t2 represents an estimated time necessary for finishing the YY ramen noodles in Restaurant B, and t3 represents an estimated time necessary for traveling from Restaurant B to A city, when a total time (t1+t2+t3) is shorter than or equal to a time left, at the present time, before 1 p.m., it is determined that the objective can be achieved, and when the total time is longer than the time left before 1 p.m., it is determined that achievement of the objective is difficult (impossible).

While it is determined that the objective can be achieved, the destination setting section 52 continues to perform, until the firstly set destination is reached, guidance on an optimal route to the destination (step S206: No, S210). On the other hand, when it is determined that the objective is difficult to achieve (step S206: Yes), the destination setting section 52 extracts anew one or a plurality of substitute places that meet the objective recognized in step S201, based on the data stored in the map/information storage section 30 and/or data obtained from the data center through the communication section 60, and indicates again the extracted substitute places to the driver by display on the screen or sound output through the output section 70 (step S207).

At this time, if a substitute place that meets the objective cannot be extracted, one or a plurality of substitute places that meet another objective similar to the objective may be extracted. For example, in the case of the YY ramen noodles described above, when the objective is difficult to achieve in Restaurant B, Restaurant C in which ZZ noodles similar to the YY ramen noodles are served may be indicated as a substitute place. The similarity may be interpreted in a range based on information accumulated in the previous navigation processing, or based on contents set by the driver.

When one of the substitute places indicated by the output section 70 is selected by the driver (step S208: Yes), the destination setting section 52 sets again the selected substitute place as a destination for which the navigation is to be performed (step S209). The guidance processing section 53 generates anew an optimal route for the destination having been set again by the destination setting section 52, and starts the guidance (step S204). On the other hand, when no substitute place is selected by the driver (step S208: No), the destination setting section 52 continues to perform, until the firstly set destination is reached, the guidance on the optimal route toward the destination, regardless of the conditions having been set in the condition setting section 40 (step S212). When the destination on which the guidance is performed is reached (step S210, S212: Yes), or when the objective is cancelled by the driver (step S211: Yes), the process is ended.

Substitute places to be indicated when it is determined that the objective is difficult to achieve, can be preset. For example, the number of times substitute places are indicated may be one, indication may not be performed when no substitute places are in a predetermined retrieval area, or substitute places outside the predetermined retrieval area may be retrieved when no substitute places are in the predetermined retrieval area.

<Specific Examples of Numerical Values>

Figure 3:
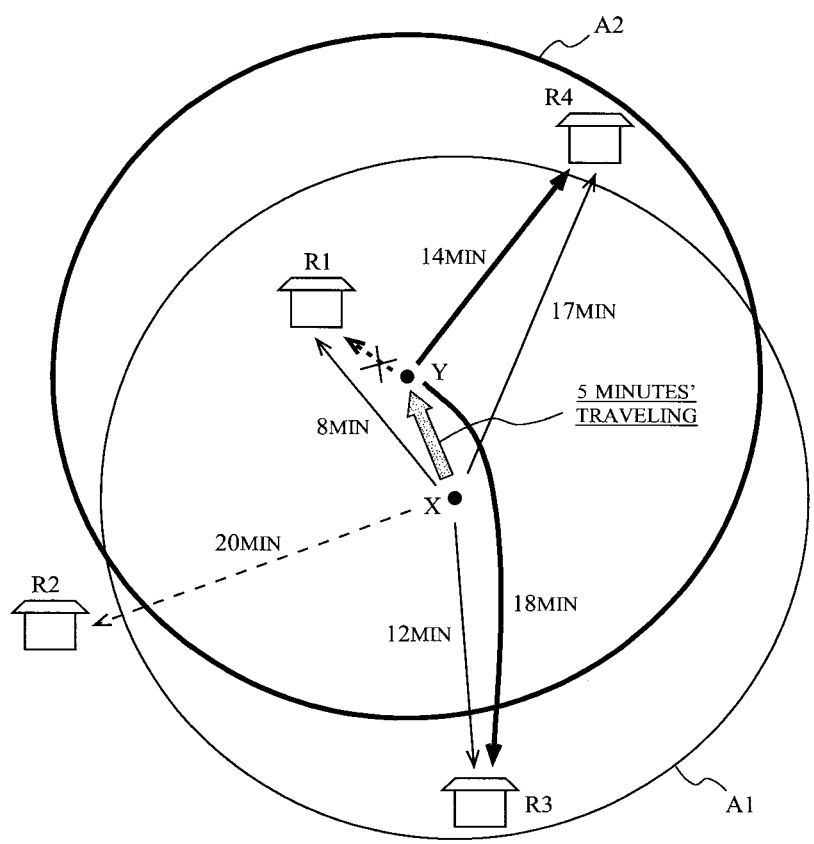
FIG. 3 specifically illustrates the destination setting process.
Figure 4:
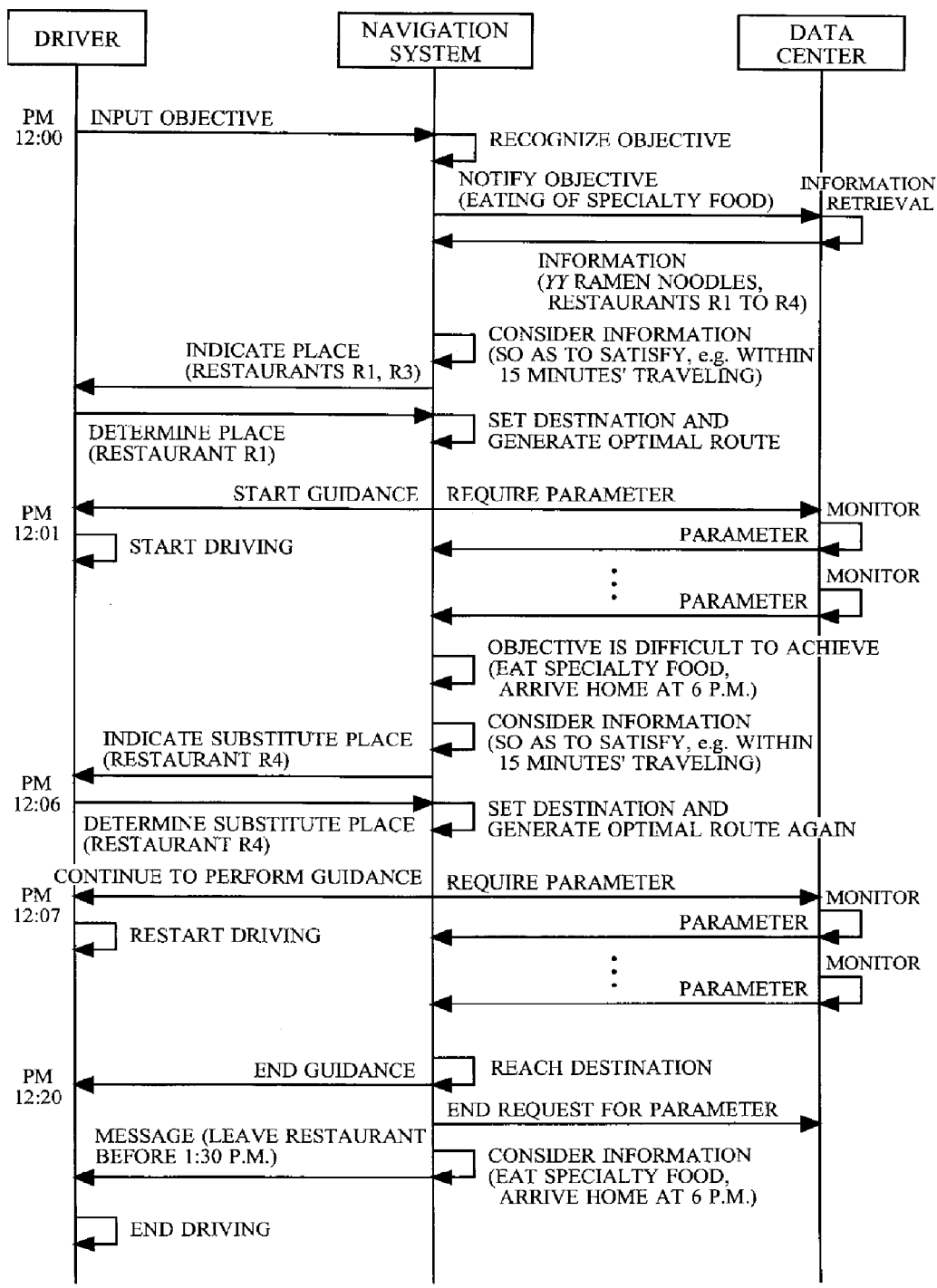
FIG. 4 illustrates the destination setting process shown in FIG. 3 in sequence.

Next, processing of the navigation system 1 of the present embodiment will be described, by using specific examples of numerical values, with further reference to FIG. 3 and FIG. 4. FIG. 3 specifically illustrates the destination setting process. FIG. 4 illustrates the destination setting process shown in FIG. 3 in sequence.

A specific exemplary case where a driver eats local specialty food on the final day of the traveling, and returns home, will be described below. In the navigation system 1, as a condition for retrieval of a surrounding area, a condition that retrieval in an area within 15 minute's traveling from a position of the vehicle is to be performed, is preset.

A case is assumed where an objective representing "would like to eat local specialty food around here, and arrive home before 6 p.m." is inputted to the input section 10 at 12 p.m. in a state where the vehicle is at a position X. In this case, the objective recognition section 51 analyzes the objective having been inputted, to recognize the objective "eat local specialty food". The destination setting section 52 extracts the specialty food "YY ramen noodles" by using, as a keyword, the "eat local specialty food" recognized by the objective recognition section 51, based on the information stored in the map/information storage section 30, or information obtained from the data center. Further, the destination setting section 52 performs retrieval in an area A1 within 15 minute's traveling by the vehicle, by regarding the present position X as the area center, and selects Restaurant R1 which is distant in the northwest direction by 8 minutes' traveling and in which the YY ramen noodles are served, and Restaurant R3 which is distant in the southern direction by 12 minutes' traveling and in which the YY ramen noodles are served. Restaurant R1 and Restaurant R3 of the YY ramen noodles which have been selected are indicated to the driver.

When the driver selects Restaurant R1 from among the indicated restaurants, the guidance processing section 53 generates an optimal route from the position X to Restaurant R1, and starts the guidance. The driver drives the vehicle toward Restaurant R1 of the YY ramen noodles according to the guidance of the navigation system 1. On the other hand, simultaneously when the guidance is started, the destination setting section 52 starts monitoring parameters that affect achievement of the objective associated with Restaurant R1.

Thereafter, it is assumed that, at a position Y that is reached when the vehicle has traveled toward Restaurant R1 for about five minutes, the destination setting section 52 determines that achievement of the objective is impossible, based on the parameters having been monitored. For example, there is a line of people for Restaurant R1 with a waiting time being one hour, and an accident has occurred on a road for a return trip home, so that a required time becomes twice a time that is usually required. Thus, for example, the destination setting section 52 determines that, if return home is performed after finishing the YY ramen noodles in Restaurant R1, the driver cannot arrive home before 6 p.m. In this case, the destination setting section 52 performs again retrieval in an area A2 within 15 minutes' traveling by regarding the present position Y as the area center, selects anew Restaurant R4 which is distant in the northeast direction by 14 minutes' traveling, for which the waiting time is 10 minutes, and in which the YY ramen noodles are served, and indicates Restaurant R4 as a substitute place to the driver. Restaurant R3 that has been firstly indicated to the driver is outside the area A2 due to the traveling of the vehicle, and Restaurant R3 is excluded from the substitute places.

When the driver selects Restaurant R4 having been indicated anew, the guidance processing section 53 generates again an optimal route from the position Y to Restaurant R4, and starts the guidance. The driver drives the vehicle toward Restaurant R4 of the YY ramen noodles according to the guidance of the navigation system 1. On the other hand, simultaneously when the guidance is started, the destination setting section 52 starts monitoring parameters that affect achievement of the objective associated with Restaurant R2.

When it is not determined that achievement of the objective is impossible, and the vehicle arrives at Restaurant R4, the guidance processing section 53 indicates to the driver a message (for example, "please leave the restaurant before 1:30 p.m. in order to arrive home before 6 p.m.") about an action that is required at the present time for achieving the objective, and the destination setting process is ended.

As described above, the navigation system 1 according to one embodiment of the present invention analyzes information inputted by a driver and recognizes the objective. Thus, a destination can be dynamically changed to a destination at which a driver's objective or another similar objective can be achieved, based on various changes in situation which occur while a vehicle is travelling, and a changed destination can be indicated.

In the above description, an in-vehicle navigation system is used as an example. However, the present invention is similarly applicable to portable mobile devices such as smartphones to which navigation applications have been downloaded. In this case, when it is determined that an objective is difficult to achieve while a user is moving toward a destination on foot, by train, or the like, substitute destinations are indicated.

INDUSTRIAL APPLICABILITY

The navigation system of the present invention is mountable as hardware or software to in-vehicle devices, portable mobile devices, or the like, and is useful particularly when guidance for supporting achievement of a user's objective is to be performed.

REFERENCE SIGNS LIST 1 navigation system
10 input section
20 position detection section
30 map/information storage section
40 condition setting section
50 control section
51 objective recognition section
52 destination setting section
53 guidance processing section
60 communication section
70 output section

The invention claimed is:

1. A navigation system that preforms route guidance according to input information, the navigation system comprising:
a user interface to which information including an objective is inputted by a user;
a control unit, which includes a processor and a memory, configured to:
recognize the objective representing an action of the user, based on the information inputted to the input section;
set, as a destination, a place at which the objective recognized by the objective recognition section can be achieved; and
perform guidance so as to reach the destination having been set by the destination setting section, wherein:
during traveling based on the guidance, when it is determined that the objective is difficult to achieve within a predetermined time, the destination setting section indicates a substitute destination at which the objective can be achieved, and
when there is not a substitute destination at which the objective can be achieved, the destination setting section indicates a substitute destination at which another objective similar to the objective can be achieved.

2. The navigation system according to claim 1, wherein the objective represents an action of a user which does not involve a destination toward which a vehicle travels.

3. The navigation system according to claim 1, wherein the destination setting section monitors at least an estimated time required for traveling to the destination and an estimated time required for achieving the objective at the place, to determine whether the objective can be achieved or the objective is difficult to achieve.

4. The navigation system according to claim 1, wherein the destination setting section determines a place at which the objective can be achieved, according to a condition based on private information of a user.

5. The navigation system according to claim 4, wherein the condition based on the private information of the user is associated with at least one of a taste of the user, a character of the user, and a constitution of the user.

6. A navigation method for performing route guidance according to input information, the navigation method comprising:
recognizing an objective representing an action of a user, based on the information that is inputted by the user and that includes the objective;
setting, as a destination, a place at which the recognized objective can be achieved;
performing guidance so as to reach the destination having been set;
determining, during traveling based on the guidance, whether the objective can be achieved within a predetermined time, or the objective is difficult to achieve within the predetermined time;
indicating a substitute destination at which the objective can be achieved, when it is determined that the objective is difficult to achieve within the predetermined time; and
indicating a substitute destination at which another objective similar to the objective can be achieved, when there is not a substitute destination at which the objective can be achieved.

* * * * *